United States Patent
Kwak et al.

(10) Patent No.: US 10,938,533 B2
(45) Date of Patent: Mar. 2, 2021

(54) METHOD FOR TRANSMITTING OR RECEIVING DEMODULATION REFERENCE SIGNAL IN WIRELESS COMMUNICATION SYSTEM AND APPARATUS THEREFOR

(71) Applicant: LG ELECTRONICS INC., Seoul (KR)

(72) Inventors: Gyoungil Kwak, Seoul (KR); Yunjung Yi, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/483,691

(22) PCT Filed: Feb. 5, 2018

(86) PCT No.: PCT/KR2018/001508
§ 371 (c)(1),
(2) Date: Aug. 5, 2019

(87) PCT Pub. No.: WO2018/143746
PCT Pub. Date: Aug. 9, 2018

(65) Prior Publication Data
US 2020/0028645 A1 Jan. 23, 2020

Related U.S. Application Data

(60) Provisional application No. 62/458,953, filed on Feb. 14, 2017, provisional application No. 62/455,375, filed on Feb. 6, 2017.

(51) Int. Cl.
*H04L 5/00* (2006.01)
(52) U.S. Cl.
CPC .......... *H04L 5/0048* (2013.01); *H04L 5/0007* (2013.01)

(58) Field of Classification Search
None
See application file for complete search history.

(56) References Cited

U.S. PATENT DOCUMENTS

2014/0254504 A1 9/2014 Bashar et al.
2015/0016239 A1 1/2015 Yi et al.

FOREIGN PATENT DOCUMENTS

WO 2009014356 A1 1/2009

OTHER PUBLICATIONS

LG Electronics, "Discussions on sPDSCH and DMRS design", 3GPP TSG RAN WG1 Meeting #87, Nov. 14-18, 2016, R1-1611777.
Nokia, Alcatel-Lucent Shanghai Bell, "On details of flexible DMRS design for 2-symbol DL shorter TTI", 3GPP TSG-RAN WG1 Meeting #87, Nov. 14-18, 2016, R1-1612212.
MediaTek Inc., "DL DMRS design for shortened TTI", 3GPP TSG RAN WG1 Meeting #87, Nov. 14-18, 2016, R1-1612748.

*Primary Examiner* — Christine T Duong
(74) *Attorney, Agent, or Firm* — Dentons US LLP

(57) ABSTRACT

In a method for supporting a short transmission time interval (sTTI) in a wireless communication system according to one embodiment of the present invention, the method is performed by a terminal, and comprises the steps of: receiving a reference signal for decoding a downlink channel; and decoding the downlink channel by using the reference signal for decoding the downlink channel, wherein the reference signal for decoding the downlink channel may be transmitted by using a pattern to which a frequency separation is applied, in the case of collision with a cell-specific reference signal.

8 Claims, 14 Drawing Sheets

FIG. 7
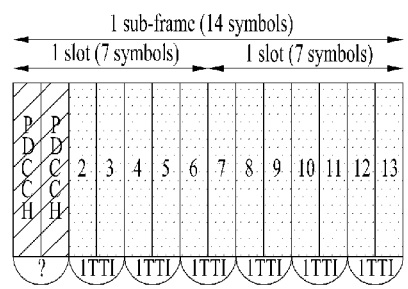
(a) 2 symbol TTI DL structure
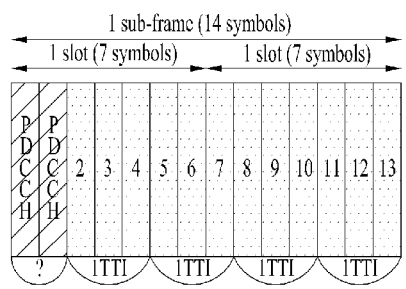
(b) 3 symbol TTI DL structure
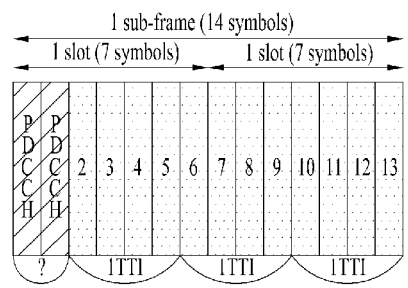
(c) 4 symbol TTI DL structure
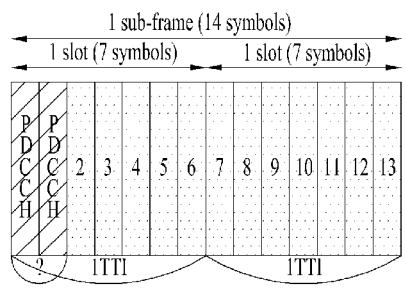
(d) 7 symbol TTI DL structure (a) DM-RS pattern A  (b) DM-RS pattern B (a) 4-AP DM-RS pattern when 4-AP CRS with vshift=0 and 4-AP CSI-RS of CSI-RS configuration 0 are present in structure of <2,3,2,2,2,3>

(b) 4-AP DM-RS pattern when 4-AP CRS with vshift=1 and 4-AP CSI-RS of CSI-RS configuration 0 are present in structure of <2,3,2,2,2,3>

(c) 4-AP DM-RS pattern when 4-AP CRS with vshift=2 and 4-AP CSI-RS of CSI-RS configuration 0 are present in structure of <2,3,2,2,2,3>

(a) 4-AP DM-RS pattern when
4-AP CRS with vshift=0 and
8-AP CSI-RS of CSI-RS configuration
4 are present in structure of <2,3,2,2,2,3>

(b) 4-AP DM-RS pattern when
4-AP CRS with vshift=1 and
8-AP CSI-RS of CSI-RS configuration
4 are present in structure of <2,3,2,2,2,3>

(c) 4-AP DM-RS pattern when
4-AP CRS with vshift=2 and
8-AP CSI-RS of CSI-RS configuration
4 are present in structure of <2,3,2,2,2,3>

METHOD FOR TRANSMITTING OR RECEIVING DEMODULATION REFERENCE SIGNAL IN WIRELESS COMMUNICATION SYSTEM AND APPARATUS THEREFOR This application is a National Stage Application of International Application No. PCT/KR2018/001508, filed on Feb. 5, 2018, which claims the benefit of U.S. Provisional Application No. 62/455,375, filed on Feb. 6, 2017 and U.S. Provisional Application No. 62/458,953, filed on Feb. 14, 2017, all of which are hereby incorporated by reference in their entirety for all purposes as if fully set forth herein.

TECHNICAL FIELD

The present disclosure relates to a wireless communication system and, more particularly, to a method of transmitting or receiving a demodulation reference signal when a short transmission timing interval is supported and an apparatus therefor.

BACKGROUND ART

The latency of packet data is one of important performance metrics. To reduce the latency of packet data and provide faster Internet access to an ender user is one of challenging issues in designing the next-generation mobile communication system called new radio access technology (RAT) as well as long term evolution (LTE).

The present disclosure provides a description related to a reference signal in a wireless communication system supporting a reduction in latency.

DISCLOSURE

Technical Problem

The present disclosure relates to an operation of a user equipment or a base station related to transmission and reception of a demodulation reference signal in a wireless communication system supporting a short transmission time interval (TTI).

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, provided herein is a method of receiving a short transmission time interval (sTTL)-based downlink (DL) signal in a wireless communication system, the method being performed by a user equipment (UE), including receiving a reference signal (RS) for decoding a DL channel, and decoding the DL channel using the RS for decoding the DL channel. If the RS for decoding the DL channel collides with a cell-specific RS, the RS for decoding the DL channel may be transmitted using a pattern to which frequency shift is applied.

Additionally or alternatively, the frequency shift may be differently configured according to frequency shift of the cell-specific RS.

Additionally or alternatively, the RS for decoding the DL channel may be applied to 2, 4, or 6 resource elements per antenna port in every sTTI of one resource block.

Additionally or alternatively, the RS for decoding the DL channel may be allocated to a fourth symbol and a fifth symbol in a second sTTI of each subframe.

Additionally or alternatively, if the RS for decoding the DL channel collides with a channel state information reference signal, the RS for decoding the DL channel may be transmitted using a pattern to which frequency shift is applied.

In another aspect of the present disclosure, provided herein is a user equipment (UE) for receiving a short transmission time interval (sTTL)-based downlink (DL) signal in a wireless communication system, including a receiver and a transmitter; and a processor configured to control the receiver and the transmitter. The processor may receive a reference signal (RS) for decoding a DL channel and decode the DL channel using the RS for decoding the DL channel. If the RS for decoding the DL channel collides with a cell-specific RS, the RS for decoding the DL channel may be transmitted using a pattern to which frequency shift is applied.

Additionally or alternatively, the frequency shift is differently configured according to frequency shift of the cell-specific RS.

Additionally or alternatively, the RS for decoding the DL channel may be applied to 2, 4, or 6 resource elements per antenna port in every sTTI of one resource block.

Additionally or alternatively, the RS for decoding the DL channel may be allocated to a fourth symbol and a fifth symbol in a second sTTI of each subframe.

Additionally or alternatively, if the RS for decoding the DL channel collides with a channel state information reference signal, the RS for decoding the DL channel may be transmitted using a pattern to which frequency shift is applied.

The aforementioned solutions are just a part of embodiments of the present disclosure. Various embodiments to which technical characteristics of the present disclosure are reflected can be drawn and understood based on detail explanation on the present disclosure to be described in the following by those skilled in the corresponding technical field.

Advantageous Effects

According to the present disclosure, a pattern of a downlink demodulation reference signal used for demodulating a short physical downlink control channel (sPDCCH)/a short physical downlink shared channel (sPDSCH) in a short TTI (sTTI) structure is newly defined so that the downlink demodulation reference signal may not collide with a legacy cell-specific reference signal (CRS) and a legacy channel state information reference signal (CSI-RS).

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this specification.

FIG. 7 illustrates the structures of DL subframes including short TTIs of multiple lengths (various numbers of symbols).

MODE FOR CARRYING OUT THE INVENTION

Figure 1:
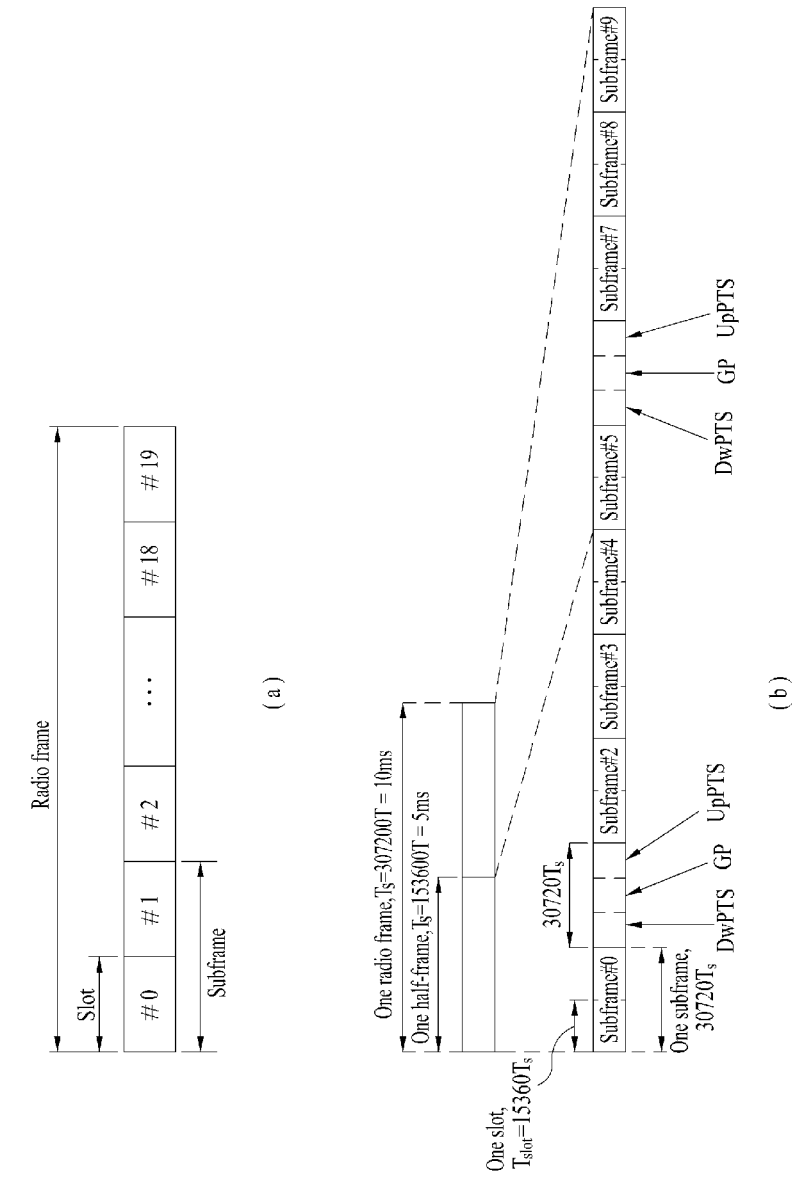
FIG. 1 is a diagram for an example of a radio frame structure used in wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. ABS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config- uration | Downlink- to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 21

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
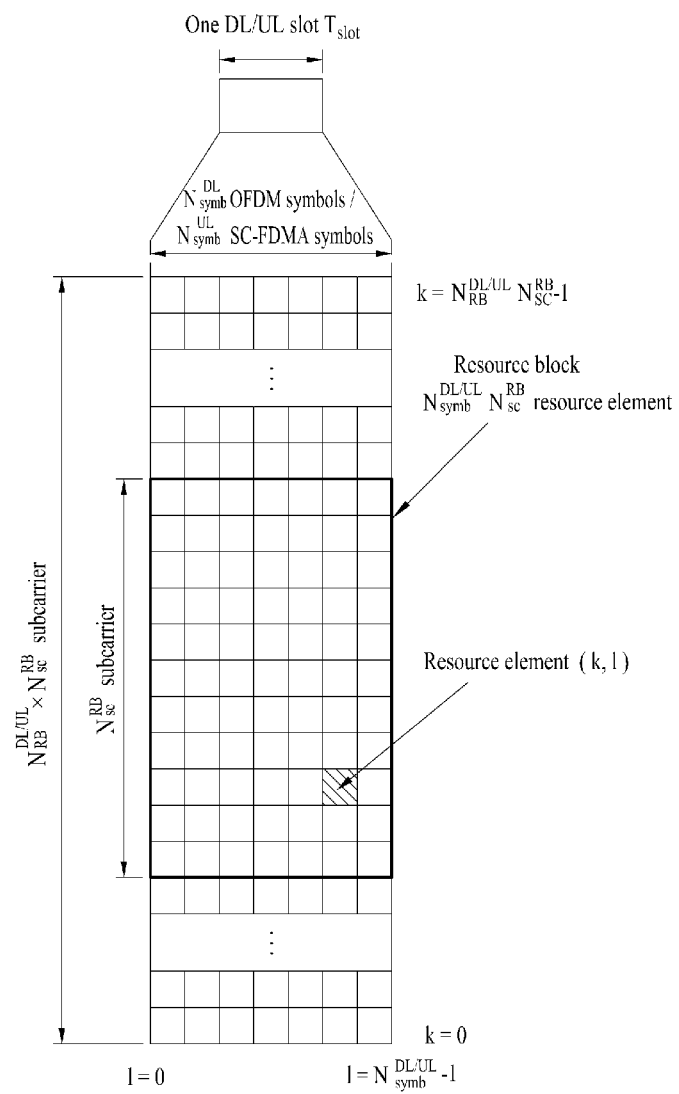
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
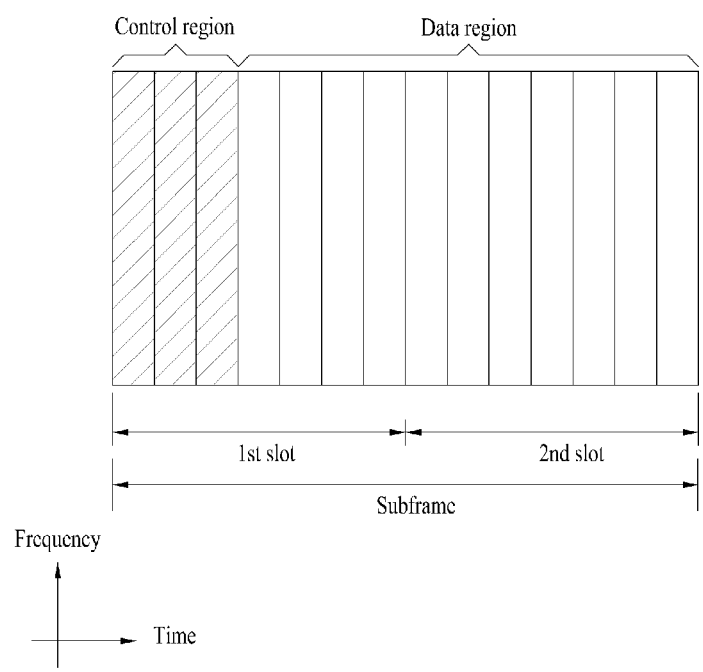
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
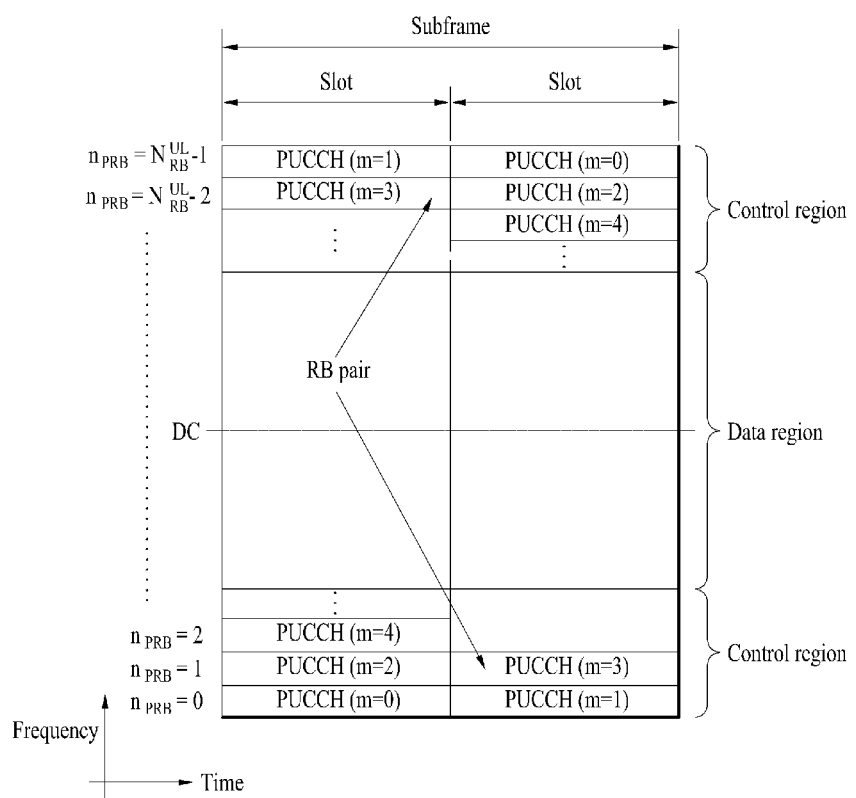
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (00K) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The Downlink Reference Signal Includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
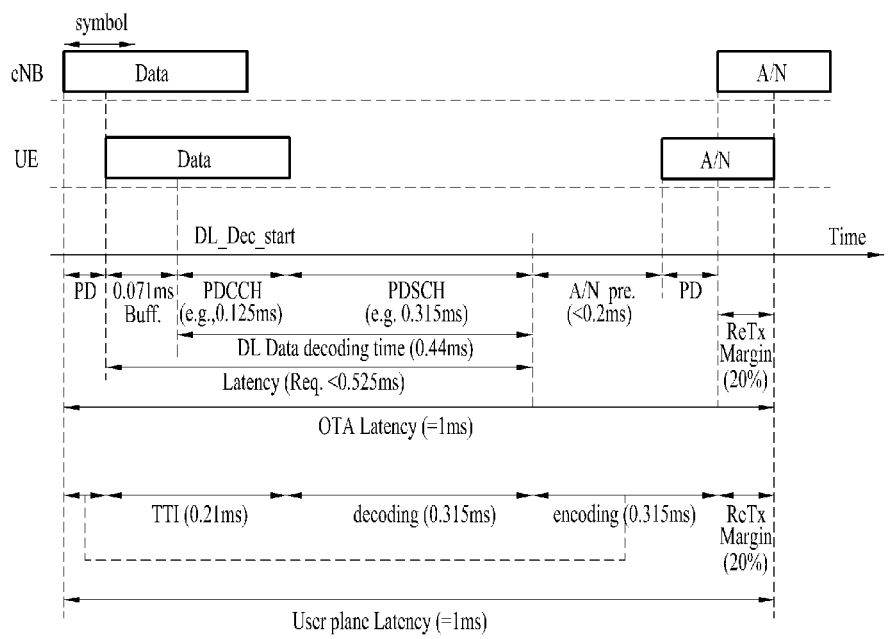
FIG. 5 illustrates a decrease in the length of a TTI according to reduction in user-plane latency.

To satisfy a reduction in the above-described latency, i.e., low latency, a TTI, which is a minimum unit for data transmission, needs to be newly designed to be reduced to a shortened TTI (sTTI) which is equal to or less than 0.5 msec (ms). For example, as illustrated in FIG. 5, in order to reduce user-plane (U-plane) latency to 1 ms until the UE completes transmission of ACK/NACK (A/N) since the eNB has started transmission of data (a PDCCH and a PDSCH), the sTTI may be configured in units of about 3 OFDM symbols.

Figure 6:
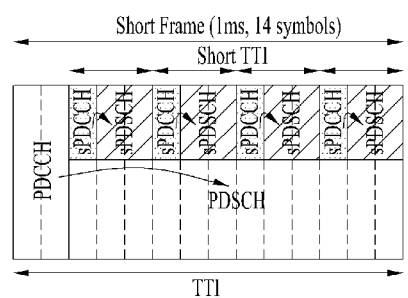
FIG. 6 illustrates an example of configuring a plurality of short TTIs in one subframe.

In a DL environment, a PDCCH for data transmission/scheduling within the sTTI (i.e., an sPDCCH) and a PDSCH for transmitting data within the sTTI (i.e., an sPDSCH) may be transmitted. For example, as illustrated in FIG. 6, a plurality of sTTIs may be configured using different OFDM symbols in one subframe. Characteristically, OFDM symbols in which legacy channels are transmitted may be excluded from 01-DM symbols constituting an sTTI. The sPDCCH and the sPDSCH within the sTTI may be transmitted in different OFDM symbol regions by being time-division-multiplexed (TDMed) or may be transmitted in different PRBs or on different frequency resources by being frequency-division-multiplexed (FDMed).

In the present disclosure, a description is given based on an LTE/LTE-A system. In a legacy LTE/LTE-A system, a 1-ms subframe may include 14 OFDM symbols in the case of a normal CP. If the 1-ms subframe is configured by TTIs shorter than 1 ms, one subframe may include a plurality of TTIs. As in examples illustrated in FIG. 7, 2 symbols, 3 symbols, 4 symbols, or 7 symbols may constitute one TTI. Although not illustrated, the case in which one symbol constitutes one TTI may be considered. If one symbol constitutes one TTI unit, 12 TTIs are generated under the assumption that legacy PDCCHs are transmitted in two OFDM symbols. Similarly, as illustrated in (a) of FIG. 7, if two symbols constitute one TTI unit, 6 TTIs may be generated. As illustrated in (b) of FIG. 7, if 3 symbols constitute one TTI unit, 4 TTIs may be generated. As illustrated in (c) of FIG. 7, if 4 symbols constitute one TTI unit, 3 TTIs may be generated. In this case, it is assumed that legacy PDCCHs are transmitted in the first starting two OFDM symbols.

As illustrated in (d) of FIG. 7, in the case in which 7 symbols constitute one TTI, 7 symbols including legacy PDCCHs may constitute one TTI and 7 subsequent symbols may constitute one TTI. If one TTI includes 7 symbols, a UE supporting an sTTI assumes that, in a TTI located at a front part of one subframe (i.e., the first slot), front two OFDM symbols in which legacy PDCCHs are transmitted are punctured or rate-matched and that data of the UE and/or control information is transmitted in 5 symbols subsequent to the front two symbols. In contrast, the UE assumes that, in a TTI located at a rear part of one subframe (i.e., the second slot), data and/control information may be transmitted in all of 7 symbols without a punctured or rate-matched resource region.

Figure 8:
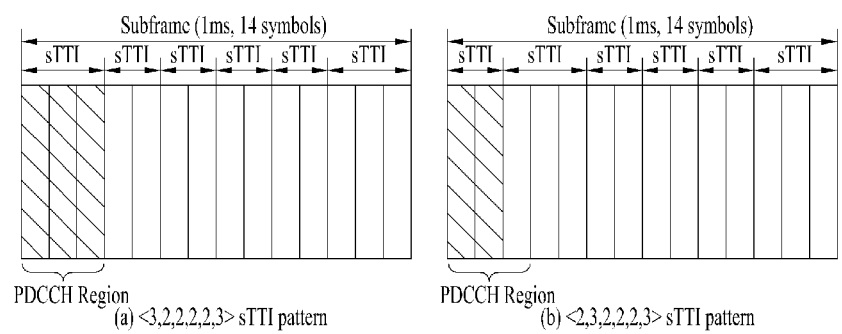
FIG. 8 illustrates the structures of DL subframes including short TTIs of 2 and 3 symbols.

The present disclosure considers an sTTI structure in which an sTTI including 2 OFDM symbols (hereinafter, OFDM symbols are referred to as "OSs") and an sTTI including 3 OSs are mixed in one subframe as illustrated in FIG. 8. In this way, an sTTI including 2 OSs or 3 OSs may be simply defined as 2-symbol sTTI (i.e., a 2-OS sTTI). In a <3,2,2,2,2,3> sTTI pattern illustrated in (a) of FIG. 8, an sPDCCH may be transmitted according to the number of symbols of a PDCCH. In a <2,3,2,2,2,3> sTTI pattern illustrated in (b) of FIG. 8, it may be difficult to transmit the sPDCCH due to a legacy PDCCH region.

The present disclosure proposes an RS for demodulation and a pattern of the RS (i.e., the location of an RE) when a physical DL channel in an sTTI (e.g., an sTTI PDCCH (sPDCCH) or an sTTI PDSCH (sPDSCH)) is transmitted. In the present disclosure, the RS for demodulation may be characteristically a DMRS.

To use an MBSFN subframe and support better intercell interference handling and a dynamic point selection (DPS) case for a control channel, it is essential to design an sPDCCH-based DM-RS even with respect to a 2-OS sTTI. Similarly, it is also essential to transmit an sPDSCH-based DM-RS to use the MBSFN subframe for data transmission.

In a next-generation system for reducing latency, it is necessary to clearly determine how a control channel is transmitted and how the control channel is multiplexed with data in designing a DM-RS pattern in each sTTI structure in order to satisfy requirements in various application fields. FDM or TDM between a control channel and a data channel in a subframe configured by sTTIs is considered. For TDM, the control channel is located in a front symbol in an sTTI and thus demodulation may be performed first only using the symbol so that latency may be reduced. However, for simplicity of implementation, FDM in units of PRBs may also be considered. However, when TDM is considered for an sPDSCH-based DM-RS, it is necessary to consider a DM-RS pattern in PRBs that data spans in one OFDM symbol due to an sPDCCH region. To this end, sharing of the DM-RS between the control channel and the data channel may be considered.

For simplicity of implementation, FDM between the control channel and the data channel may also be considered.

The present disclosure describes design for a DM-RS pattern in a DL sTTI considering 2 OSs and 7 OSs as one sTTI. A 2-OS sTTI may include a 3-OS sTTI at a specific location. Design for such a DM-RS pattern design may be extended to a 3-OS, 4-OS, 5-OS, or 6-OS sTTI.

The contents of the present disclosure may be applied to both subframe structure type 1 of FDD and subframe structure type 2 of TDD. In TDD, the contents of the present disclosure may be applied to a special subframe as well as a normal subframe.

Definition of DM-RS in 7-symbol DL sTTI

In a 7-OS sTTI, when a DM-RS-based sPDCCH schedules a DM-RS-based sPDSCH, if a DM-RS is not shared between a control region and a data region, an independent DM-RS pattern in the control/data region needs to be necessarily transmitted. If a DM-RS of the data region is used in the control region, a processing time for the control channel will increase. In terms of this viewpoint, it is essential to separate the DM-RS with respect to the control/data region even in a 7-OS case. For DM-RS design for the control region in the 7-OS sTTI, the size of an sPDCCH region of the 7-OS sTTI needs to be clearly determined.

Generally, if possible, common design between a 2-OS sTTI, a 7-OS sTTI, and a legacy TTI may be desirably considered. From this viewpoint, a DM-RS pattern of a control region of the 7-OS sTTI may be equal to a DM-RS pattern of a control region of the 2-OS sTTI. In this case, DM-RS patterns of sTTI0 in both the 2-OS sTTI and the 7-OS sTTI should differ according to the number of symbols of all legacy PDCCHs.

The DM-RS pattern for the 7-OS sTTI may reuse a legacy DM-RS pattern if a particular problem does not arise. This means that the DM-RS pattern of the 7-OS sTTI may be represented as a time-shifted version of OFDM symbols constituting a legacy DM-RS pattern of a normal subframe or a legacy DM-RS pattern of a special subframe.

Figure 9:
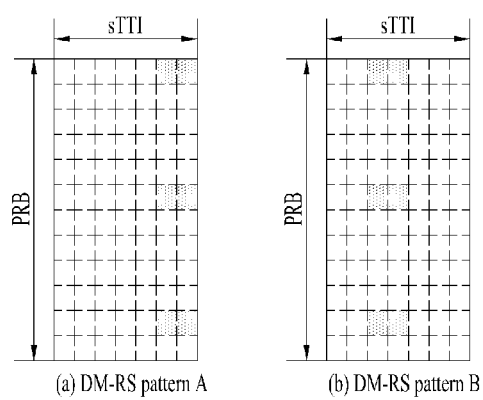
FIG. 9 illustrates patterns of demodulation reference signals used in short TTIs.

The legacy DM-RS pattern may consider two patterns as illustrated in FIG. 9.

However, use of DM-RS pattern B may be problematic. If DM-RS pattern B is used in an sTTI of the first slot (i.e., a 7-OS sTTI), a DM-RS may collide with a legacy PDCCH region when the size of the legacy PDCCH region is 3 OFDM symbols. In addition, if a CSI-RS is transmitted in the third and fourth OFDM symbols (i.e., OFDM symbols 2 and 3) of the second slot, the DM-RS may collide with the CSI-RS. To solve such collision, DM-RS pattern A is used in an sTTI of the first slot. The same DM-RS pattern (i.e., DM-RS pattern A) is used in an sTTI of the second slot. In this case, a DM-RS pattern in the sTTI of the first slot is equal to a DM-RS pattern in 2-OS sTTI2 and a DM-RS pattern in the sTTI of the second slot is equal to a DM-RS pattern in 2-OS sTTI4.

The above description may be extended such that the DM-RS pattern of the 7-OS sTTI may be represented as a combination of DM-RS patterns of a 2-OS sTTI. In this case, 2-OS DM-RS patterns constituting the 7-OS sTTI are configurable and include a 2-OS pattern in which the DM-RS is not present. In addition, a DM-RS pattern of sTTI0 may differ according to the number of symbols of a legacy PDCCH. This is applied to the control region and the data region.

The DM-RS pattern of the 7-OS sTTI may be configured by a network according to a mobile speed of a UE or a modulation and coding scheme (MCS) level. Different DM-RS patterns may be applied to the control region and the data region. Alternatively, concatenated DM-RS patterns may be applied. If the control region is locally mapped, the same DM-RS pattern may be applied to the control region and the data region. If the control region is distributively mapped, it may be assumed that a cell-specific or a group-common DM-RS pattern is used. Alternatively, it may be assumed that a fixed DM-RS pattern is used. To avoid collision with the CSI-RS, a different DM-RS pattern may be defined per subframe set according to CSI configuration.

For the 7-OS sTTI, a new DM-RS pattern other than the legacy DM-RS pattern may be considered. In this case, the DM-RS may be present in sTTI0 in which the legacy PDCCH is present. The DM-RS may be punctured according to a legacy PDCCH or an sPDCCH. The new DM-RS pattern may use a time-shifted version of a legacy DM-RS or use the DM-RS pattern of the 2-OS sTTI. As an example, when two DM-RS pairs can be transmitted in the first and second OSs and in the third and fourth OSs, if a physical resource block (PRB) is used in a control region, only DM-RSs of the third and fourth OSs are used. That is, only the third and fourth OSs are transmitted or it may be assumed that only the third and fourth OSs are transmitted. Therefore, an orthogonal cover code (OCC) should not be present between the two DM-RS pairs and the two DM-RS pairs need to be configured to be repeated in the same form.

While the above description has been given based on FDD, the same method may be equally applied to a normal subframe of TDD.

In the case of a special subframe of TDD, the legacy DM-RS pattern may be used for data of each special subframe. A DM-RS for the control region may be handled using the same method applied to FDD.

Definition of DM-RS in 2-symbol DL sTTI

Figure 10:
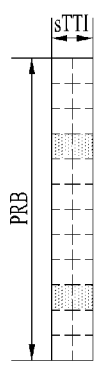
FIG. 10 illustrates a basic pattern of a demodulation reference signal used in a short TTI of one PRB.

For a 2-symbol sTTI, a situation in which control and data regions or channels are TDMed or FDMed may be considered. In this case, the number of DM-RS symbols in each sTTI may be 1, 2, or 3. Performance may differ according to how many OSs in one sTTI are configured for DM-RS-based sPDCCH transmission. The present disclosure assumes that the number of DM-RS symbols is 2 in consideration of channel estimation performance and latency. In terms of RS overhead, a DM-RS pattern of 4 REs/RBs per antenna port is considered. A basic DM-RS pattern may be proposed as illustrated in FIG. 10. The present disclosure may be extended such that the number of DM-RS symbols is 1 or 3 and a DM-RS pattern of 2 REs/RBs or 6 REs/RBs per antenna port is configured. In addition, as an extension of the pattern illustrated in FIG. 10, the basic DM-RS pattern may be defined in two PRBs or may be defined in one or more PRBs.

A DL DM-RS in the 2-symbol DL sTTI may consider the following viewpoints.

The same DM-RS pattern is applied to a 2-OS sTTI and a 3-OS sTTI.

The maximum number of antenna ports (APs) of an sPDCCH DM-RS may be limited to 2 and the maximum number of APs of an sPDSCH DM-RS may be limited to 4.

DM-RS REs are located so as to avoid collision with a cell-specific RS (CRS) and zero power (ZP)/non-zero power (NZP) CSI-RS.

Handling for collision with a PRS is not assumed.

Since it may not be assumed that a DM-RS is present only in a non-normal subframe, the present disclosure proposes design for a DM-RS pattern that particularly considers potential collision with a CRS and a CSI-RS.

Occurrence of Collision with CRS and Solutions

Basically, a DM-RS in an sTTI should be located at a position except for a region in which a CRS is located. The CRS may be located in sTTI0, sTTI1, sTTI3, or sTTI5. Since the location of the CRS may differ according to frequency shift, i.e., a v-shift ($v_{shift}$) value, caused by a physical cell ID PCellID, it may be impossible to design a common fixed DM-RS pattern capable of avoiding collision with the CRS in all sTTI of a normal subframe. Therefore, the present disclosure proposes the following solutions.

(1) Method of Varying DM-RS pattern according to $v_{shift}$ of CRS

Figure 11:
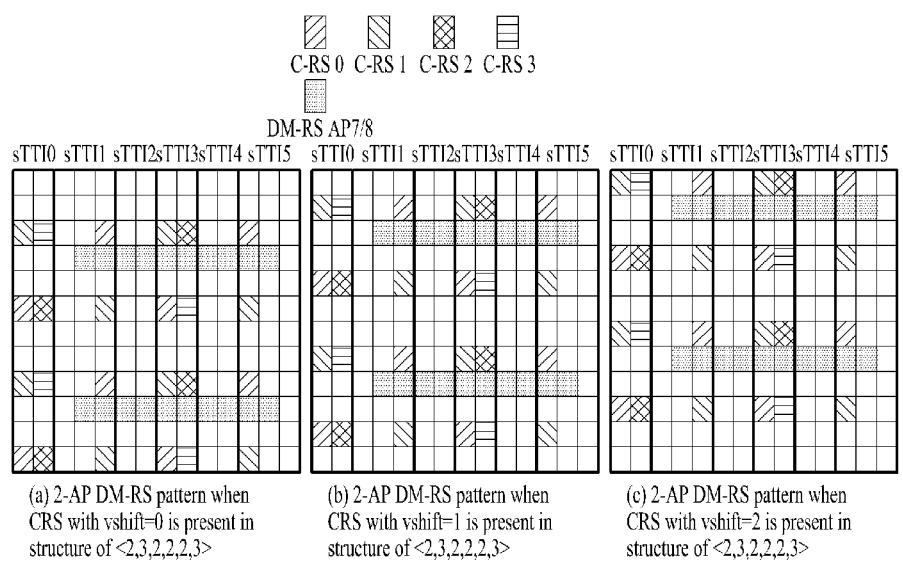
FIGS. 11, 12, and 13 illustrate (RE) patterns of a demodulation reference signal that does not collide with a CRS (RE).

A DM-RS pattern that differs according to the $v_{shift}$ value of the CRS may be considered. Simply, $v_{shift}$ of the DM-RS may be applied according to the $v_{shift}$ value of the CRS of a serving cell. FIG. 11 illustrates examples of 2-AP DM-RS patterns that vary with $v_{shift}$ values 0, 1, and 2 of a 4-AP CRS in an sTTI structure of <2,3,2,2,2,3> pattern. DM-RSs may be FDMed or CDMed in AP 7 and AP 8. While an example of AP 7 or AP 8 has been described, other AP numbers may be used. In FIG. 11, although it is assumed that the number of DM-RSs per AP in one PRB is 4 REs per sTTI, the number of DM-RSs may be extended to 2 REs or 6 REs.

Figure 12:
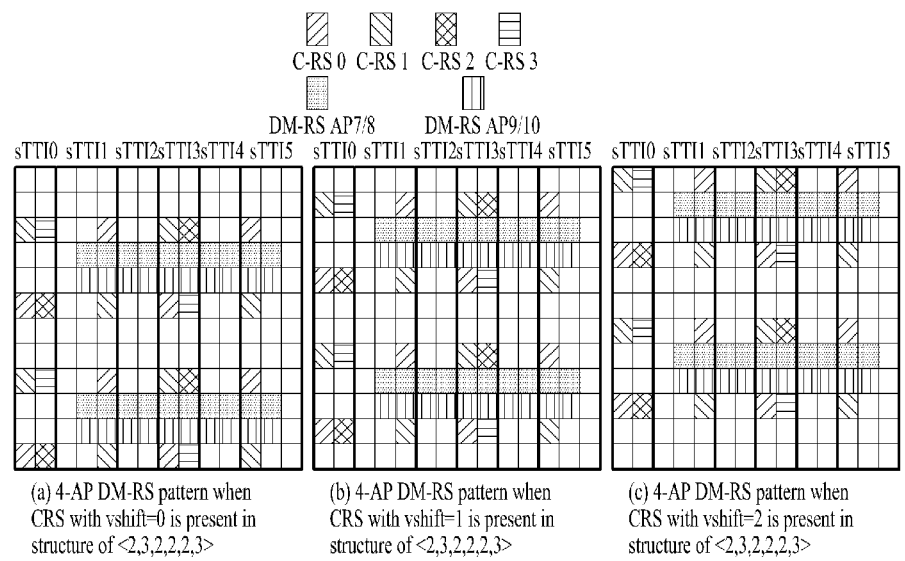

FIG. 12 illustrates examples of 4-AP DM-RS patterns that vary with $v_{shift}$ values 0, 1, and 2 of a 4-AP CRS in an sTTI structure of <2,3,2,2,2,3> pattern. While, in FIG. 12, it is assumed that the number of DM-RSs per AP in one PRB is 4 REs per sTTI, the number of DM-RSs per AP may be extended to 2 REs or 6 REs. DM-RSs may be CDMed or CDMed between AP 7 and AP 8 and between AP 9 and AP 10. Other AP numbers may be applied in the above example in addition to APs 7, 8, 9, and 10.

If the DM-RSs are located in the last two OSs of sTTI1 including 3 OSs, a common DM-RS pattern may be used in both <2,3,2,2,2,3> and <3,2,2,2,2,3> patterns.

Thus, the method of avoiding collision with the CRS by shifting the DM-RS in the direction of a frequency axis (v-shift) according to the $v_{shift}$ value of the CRS may be extended even in the case in which the number of DM-RSs in one sTTI varies, the number of DM-RS REs per AP in one PRB varies, or the number of OSs constituting one sTTI varies. The method may also be extensively applied to a normal subframe and a special subframe of TDD.

More characteristically, an sTTI including an OS colliding with the CRS may use a pattern obtained by shifting the DM-RS in a frequency direction and an sTTI that does not collide with the CRS may use a basic DM-RS pattern. Even when an sTTI collides with a CSI-RS, a DM-RS pattern obtained in the same manner as the above method is used. That is, an sTTI including an OS colliding with the CSI-RS may use a pattern obtained by shifting the DM-RS in a frequency direction and an sTTI including an OS that does not collide with the CSI-RS may use the basic DM-RS pattern.

(2) Method using Fixed DM-RS Pattern

If a fixed DM-RS pattern like a legacy DM-RS pattern is used, DM-RS transmission may not be performed in an sTTI in which collision with the CRS occurs. In this case, the sTTI may be wasted without performing any transmission or may fall back to CRS-based sPDCCH/sPDSCH transmission.

Occurrence of Collision with CSI-RS and Solutions

In designing a DL DM-RS pattern, collision with the CSI-RS as well as collision with the CRS needs to be considered. Herein, the CSI-RS may include a ZP CSI-RS and an NZP CSI-RS. Basically, the DM-RS may be located at a position at which the DM-RS does not collide with CSI-RS REs. A solution for avoiding collision with the CSI-RS includes a method in which a DM-RS pattern varies with CSI-RS configuration.

Two cases of the case in which the DL DM-RS collides with the CSI-RS and the case in which the DL DM-RS does not collide with the CSI-RS may be separately considered. There are a subframe in which the CSI-RS is present and a subframe in which the CSI-RS is not present according to a duty cycle of the CSI configuration. In the subframe in which the CSI-RS is present, the CSI-RS may be located in sTTI2, sTTI4, and sTTI5. The DM-RS has a possibility of collision with the CSI-RS in these sTTIs. Obviously, collision does not occur in the subframe in which the CSI-RS is not present.

If collision with the CSI-RS does not occur, the DM-RS pattern may be determined by taking into account only collision with the CRS as in the example of FIG. 11 or 12.

If collision with the CSI-RS occurs, the following detailed methods may be applied.

Alt1. Different DM-RS patterns may be applied using different $v_{shift}$ values according to whether the DM-RS collides with the CSI-RS. A $v_{shift}$ value may be set with respect to the DM-RS that collides with the CSI-RS. Extensively, a method of setting $v_{shift}$ values of the DM-RSs of all sTTIs may be used.

Alt2. A method in which the UE does not expect that scheduling of sPDCCH/sPDSCH in an sTTI in which the DM-RS collides with the CSI-RS will be performed may be considered.

Alt3. A method of not transmitting the DM-RS in an sTTI in which the DM-RS collides with the CSI-RS may be used. In this case, the sPDCCH/sPDSCH should be transmitted based on the CRS. A method of performing channel estimation based on the CRS may be considered. However, since the CRS is not located in an sTTI in which the CSI-RS can be located, a channel estimated in a previous sTTI may be used.

Figure 13:
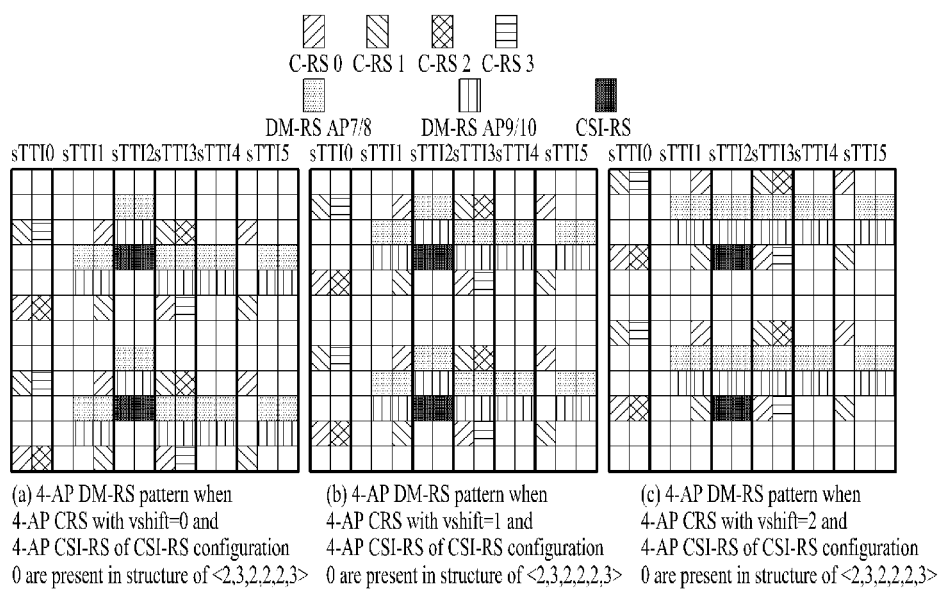

FIG. 13 illustrates examples of 4-AP DM-RS patterns that vary with $v_{shift}$ values 0, 1, and 2 of a 4-AP CRS in a subframe including a 4-AP CSI-RS of CSI-RS configuration 0 in an sTTI structure of <2,3,2,2,2,3> pattern. While, in FIG. 13, it is assumed that the number of DM-RSs per AP in one PRB is 4 REs per sTTI, the number of DM-RSs per AP may be extended to 2 REs or 6 REs. DM-RSs may be FDMed or CDMed between AP 7 and AP 8 and between AP 9 and AP 10. Other AP numbers may be applied in the above example in addition to APs 7, 8, 9, and 10.

Figure 14:
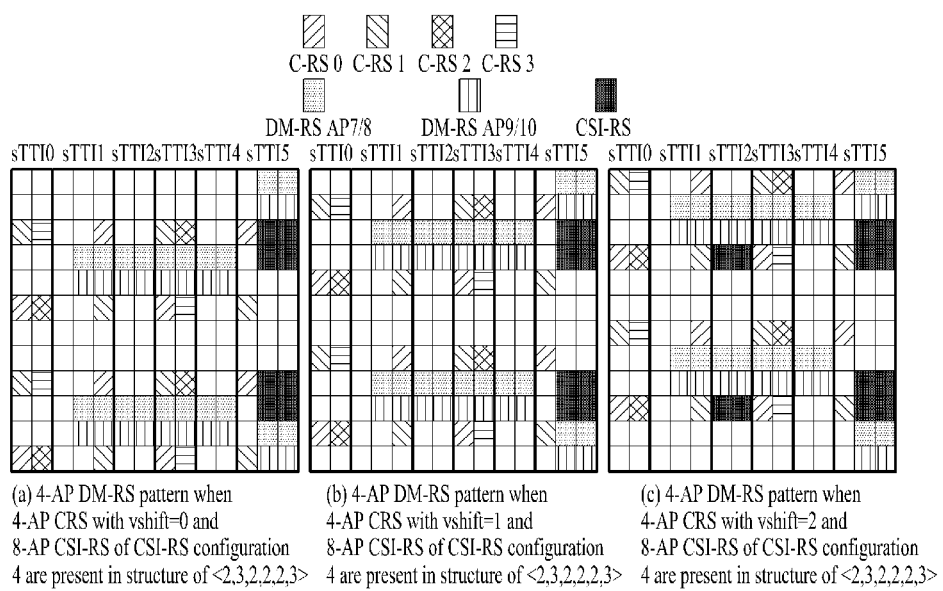
FIG. 14 illustrates (RE) patterns of a demodulation reference signal that does not collide with a CSI-RS (RE).

FIG. 14 illustrates examples of 4-AP DM-RS patterns that vary with $v_{shift}$ values 0, 1, and 2 of a 4-AP CRS in a subframe including a 4-AP CSI-RS of CSI-RS configuration 4 in an sTTI structure of <2,3,2,2,2,3> pattern. While, in FIG. 13, it is assumed that the number of DM-RSs per AP in one PRB is 8 REs per sTTI, the number of DM-RSs per AP may be extended to 2 REs or 6 REs. DM-RSs may be FDMed or CDMed between AP 7 and AP 8 and between AP 9 and AP 10. Other AP numbers may be applied in the above example in addition to APs 7, 8, 9, and 10.

If a 4-AP DM-RS is located in OSs starting from the first OS in the last sTTI (i.e., sTTI5) which is a 3-OS TTI of a subframe in which an 8-AP CSI-RS of CSI-RS configuration 4 is present, collision of the DM-RS with a CRS or a CSI-RS is inevitable even in any case. Therefore, in order to prevent this situation, the DM-RS in sTTI5 may be located in OSs starting from the second OS in sTTI5 corresponding to a 3-OS sTTI.

Thus, the method of shifting the DM-RS in a frequency axis in order to avoid collision with the CSI-RS located according to CSI-RS configuration may be extended to the case in which CSI-RS configuration varies, the number of DM-RS symbols in one sTTI varies, the number of DM-RS REs per AP in one PRB varies, or the number of OSs constituting one sTTI. The method may also be extensively applied to a normal subframe or a special subframe of TDD.

Since examples of the above-described proposed methods may also be included in one of implementation methods of the present disclosure, it is obvious that the examples are regarded as the proposed methods. Although the above-described proposed methods may be independently implemented, the proposed methods may be implemented in a combined (aggregated) form of a part of the proposed methods. A rule may be defined such that the eNB informs the UE of information as to whether the proposed methods are applied (or information about rules of the proposed methods) through a predefined signal (e.g., a physical layer signal or a higher-layer signal).

Figure 15:
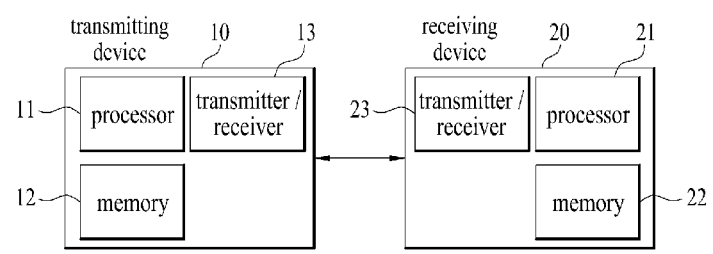
FIG. 15 is a block diagram for a device configured to implement embodiment(s) of the present disclosure.

FIG. 15 is a block diagram of a transmitting device 10 and a receiving device 20 configured to implement exemplary embodiments of the present disclosure. Referring to FIG. 6, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In embodiments of the present disclosure, a UE serves as the transmission device 10 on uplink and as the receiving device 20 on downlink. In embodiments of the present disclosure, an eNB serves as the receiving device 20 on uplink and as the transmission device 10 on downlink.

The transmitting device and/or the receiving device may be configured as a combination of one or more embodiments of the present disclosure.

As one of these embodiments, a method of receiving an sTTI-based DL signal in a wireless communication system is proposed. The method is performed by a UE. The UE may receive an RS for decoding a DL channel. The UE may decode the DL channel using the RS for decoding the DL channel. If the RS for decoding the DL channel collides with a CRS, the RS for decoding the DL channel may be transmitted using a pattern to which frequency shift is applied.

The frequency shift is differently configured according to frequency shift of the CRS.

The RS for decoding the DL channel may be applied to 2, 4, or 6 REs per antenna port in every sTTI of one RB.

The RS for decoding the DL channel may be allocated to a fourth symbol and a fifth symbol in a second sTTI of each subframe.

If the RS for decoding the DL channel collides with a CSI-RS, the RS for decoding the DL channel may be transmitted using a pattern to which frequency shift is applied.

The detailed description of the exemplary embodiments of the present disclosure has been given to enable those skilled in the art to implement and practice the disclosure. Although the disclosure has been described with reference to the exemplary embodiments, those skilled in the art will appreciate that various modifications and variations can be made in the present disclosure without departing from the spirit or scope of the disclosure described in the appended claims. For example, those skilled in the art may use each construction described in the above embodiments in combination with each other. Accordingly, the disclosure should not be limited to the specific embodiments described herein, but should be accorded the broadest scope consistent with the principles and novel features disclosed herein.

INDUSTRIAL APPLICABILITY

The present disclosure may be used for a wireless communication apparatus such as a user equipment (UE), a relay and an eNB.

The invention claimed is:

1. A method of receiving a short transmission time interval (sTTI)-based downlink (DL) signal by a user equipment (UE) in a wireless communication system, the method comprising:
    receiving a cell specific reference signal (CRS) and a demodulation reference signal (DMRS) for a DL channel;
    receiving a channel state information (CSI)-RS and the DMRS; and
    demodulating the DL channel using the DMRS,
    wherein a first frequency shifted pattern for the DMRS is determined not to overlap with resource elements for the CRS based on default resource elements for the DMRS colliding with the resource elements for the CRS in a first corresponding sTTI,
    wherein a second frequency shifted pattern for the DMRS is determined not to overlap with resource elements for the CSI-RS based on default resource elements for the DMRS colliding with the resource elements for the CSI-RS in a second corresponding sTTI, and
    wherein the second frequency shifted pattern is determined based on a configuration of the resource elements for the CSI-RS.

2. The method of claim 1, wherein resource elements for the DMRS in a corresponding sTTI are determined as the default resource elements based on the default resource elements for the DMRS not colliding with any of the CRS and the CSI-RS.

3. The method of claim 1, wherein the first frequency shifted pattern is determined based on a frequency shift value corresponding to a cell identity.

4. The method of claim 1, wherein the DMRS is applied to 2, 4, or 6 resource elements per antenna port in every sTTI of one resource block.

5. A user equipment (UE) for receiving a short transmission time interval (sTTI)-based downlink (DL) signal in a wireless communication system, the UE comprising:
    a receiver and a transmitter; and
    a processor configured to control the receiver and the transmitter,
    wherein the processor is further configured to:
        receive a cell specific reference signal (CRS) and a demodulation reference signal (DMRS) for a DL channel,
        receive a channel state information (CSI)-RS and the DMRS, and
        demodulate the DL channel using the DMRS, and
    wherein a first frequency shifted pattern for the DMRS is determined not to overlap with resource elements for the CRS based on default resource elements for the DMRS colliding with the resource elements for the CRS in a first corresponding sTTI,
    wherein a second frequency shifted pattern for the DMRS is determined not to overlap with resource elements for the CSI-RS based on default resource elements for the DMRS colliding with the resource elements for the CSI-RS in a second corresponding sTTI, and
    wherein the second frequency shifted pattern is determined based on a configuration of the resource elements for the CSI-RS.

6. The UE of claim 5, wherein resource elements for the DMRS in a corresponding sTTI are determined as the default resource elements based on the default resource elements for the DMRS not colliding with any of the CRS and the CSI-RS.

7. The UE of claim 5, wherein first frequency shifted pattern is determined based on a frequency shift value corresponding to a cell identity.

8. The UE of claim 6, wherein the DMRS is applied to 2, 4, or 6 resource elements per antenna port in every sTTI of one resource block.

* * * * *